(12) United States Patent
Sakata et al.

(10) Patent No.: US 10,814,886 B2
(45) Date of Patent: Oct. 27, 2020

(54) SYSTEM OF OPTIMIZING ACTIVATION DEGREE OF OCCUPANT OF VEHICLE

(71) Applicant: TOYOTA BOSHOKU KABUSHIKI KAISHA, Aichi-ken (JP)

(72) Inventors: Masaru Sakata, Aichi-ken (JP); Kengo Inoue, Aichi-ken (JP); Miki Kujime, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/400,663

(22) Filed: May 1, 2019

(65) Prior Publication Data
US 2019/0344805 A1 Nov. 14, 2019

(30) Foreign Application Priority Data
May 9, 2018 (JP) .................. 2018-090585

(51) Int. Cl.
*B60R 25/25* (2013.01)
*B60W 50/16* (2020.01)
*B60W 40/08* (2012.01)
*B60R 11/02* (2006.01)
*G06K 9/00* (2006.01)
*B60N 2/90* (2018.01)

(52) U.S. Cl.
CPC .............. *B60W 50/16* (2013.01); *B60N 2/90* (2018.02); *B60R 11/0217* (2013.01); *B60W 40/08* (2013.01); *G06K 9/00845* (2013.01); *B60N 2002/981* (2018.02); *B60W 2040/0827* (2013.01)

(58) Field of Classification Search
CPC ................. B60W 50/16; B60W 40/08; B60W 2040/0827; B60N 2/90; B60N 2002/981; B60R 11/0217
See application file for complete search history.

(56) References Cited

U.S. PATENT DOCUMENTS

| | | |
|---|---|---|
| 2016/0283856 A1* | 9/2016 | Jayaraman ............. G16H 50/30 |
| 2018/0174457 A1* | 6/2018 | Taylor .................. G06N 3/0454 |
| 2018/0194280 A1* | 7/2018 | Shibata ................... A61B 5/18 |
| 2018/0319279 A1* | 11/2018 | Ikeda ................. G01C 21/3484 |
| 2018/0364966 A1* | 12/2018 | Valeri ..................... G06F 3/167 |
| 2019/0031145 A1* | 1/2019 | Trelin .................... B60R 25/25 |
| 2019/0300002 A1* | 10/2019 | Fung .................. G06K 9/00536 |

FOREIGN PATENT DOCUMENTS

JP 2013-191215 9/2013

\* cited by examiner

*Primary Examiner* — Brent Swarthout
(74) *Attorney, Agent, or Firm* — Greenblum & Bernstein, P.L.C.

(57) ABSTRACT

A system of optimizing an activation degree of an occupant of a vehicle, the system including: a speaker configured to play music for the occupant; and a controller configured to: determine whether an activation degree detected by an detector is in an appropriate state set in advance; and actuate the speaker to play music when determined that the activation degree of the occupant is not in the appropriate state, the music being selected in advance, being unique to the occupant, arousing pleasant emotion of the occupant, and being high tempo music having a tempo equal to or higher than a predetermined tempo or low tempo music having a tempo equal to or lower than a predetermined tempo.

13 Claims, 9 Drawing Sheets

FIG. 6

| SLEEPINESS DEGREE N | STATE |
|---|---|
| 5 | SLEEPING |
| 4 | EXTREMELY SLEEPY |
| 3 | QUITE SLEEPY |
| 2 | SLEEPY |
| 1 | LITTLE BIT SLEEPY |
| 0 | NOT SLEEPY |

…

SYSTEM OF OPTIMIZING ACTIVATION DEGREE OF OCCUPANT OF VEHICLE

CROSS-REFERENCE TO RELATED APPLICATIONS

This application claims priority from Japanese Patent Application No. 2018-090585 filed on May 9, 2018, the entire contents of which are incorporated herein by reference.

TECHNICAL FIELD

The disclosure relates to a system of optimizing an activation degree of an occupant of a vehicle.

BACKGROUND ART

An invention has been developed in which an alarm is issued to wake up a driver if a danger of drowsy driving is determined (see JP-A-2013-191215).

In the above invention, the effect of awakening the driver is temporary even if the alarm is issued for the drowsy driving. In order to sustain the effect, the alarm needs to be continued, which causes the driver to be unpleasant.

Further, in the above invention, an excited state of an occupant, who becomes emotional due to some reasons and is in the excited state, cannot be inhibited.

SUMMARY

An object of the disclosure is to prevent an occupant from feeling unpleasant and make an activation degree of the occupant in an appropriate state by arousing pleasant emotion of the occupant.

According to an aspect of the disclosure, there is provided a system of optimizing an activation degree of an occupant of a vehicle, the system including: activation degree determination means for detecting an activation degree of an occupant and determining whether the detected activation degree is in an appropriate state set in advance; a speaker configured to play music for the occupant; and speaker actuating means for selecting music which is unique to the occupant, which arouses pleasant emotion of the occupant, and which is high tempo music having a tempo equal to or higher than a predetermined tempo or low tempo music having a tempo equal to or lower than a predetermined tempo, and actuating the speaker to play the selected music when the activation degree determination means determines that the activation degree of the occupant is not in the appropriate state.

According to another aspect of the disclosure, there is provided a system of optimizing an activation degree of an occupant of a vehicle, the system including: a speaker configured to play music for the occupant; and a controller configured to: determine whether an activation degree detected by an detector is in an appropriate state set in advance; and actuate the speaker to play music when determined that the activation degree of the occupant is not in the appropriate state, the music being selected in advance, being unique to the occupant, arousing pleasant emotion of the occupant, and being high tempo music having a tempo equal to or higher than a predetermined tempo or low tempo music having a tempo equal to or lower than a predetermined tempo.

BRIEF DESCRIPTION OF DRAWINGS

FIG. 6 is a chart showing a level of sleepiness degree N in the control of the computer:

DETAILED DESCRIPTION

<Schematic Configuration of Embodiment>

Figure 1:
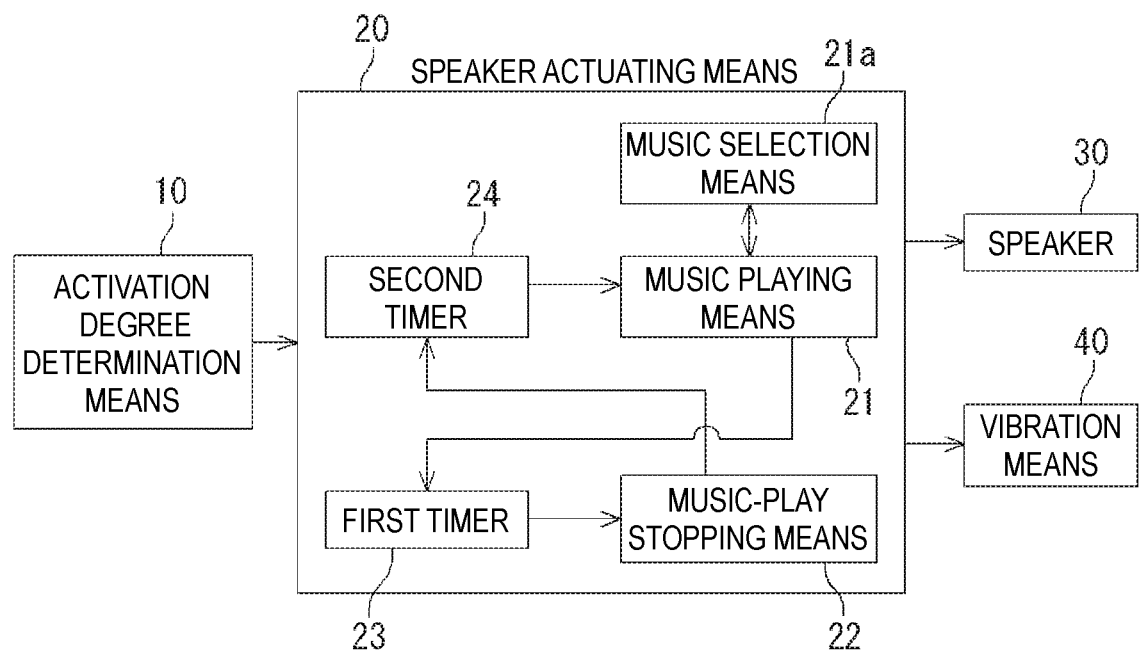
FIG. 1 is a functional block diagram of an embodiment of the disclosure.

FIG. 1 shows a system of optimizing an activation degree of an occupant of a vehicle according to an embodiment of the disclosure. The system includes: activation degree determination means 10 for determining an activation degree such as sleepiness or an excited state of an occupant; a speaker 30 that plays music for the occupant; speaker actuating means 20 for actuating the speaker 30; and vibration means 40 for causing at least a part of the body of the occupant seated on a vehicle seat to vibrate.

The speaker actuating means 20 includes music playing means 21 and music-play stopping means 22. The music playing means 21 causes the speaker 30 to play the music when the activation degree determination means 10 determines that sleepiness and an excited state of the occupant are equal to or higher than a set level, that is, when the activation degree of the occupant is not in an appropriate state. At the same time, the vibration means 40 is also actuated as required. The music to be played by the speaker 30 is selected by the occupant in advance, and is stored in music selection means 21a. The music selected in advance is music which is unique to and preferred by the occupant, which arouses pleasant emotion of the occupant, and which is high tempo music having a tempo equal to or higher than a predetermined tempo (for example, 104 beat/min), or low tempo music having a tempo equal to or lower than a predetermined tempo (for example, 60 beat/min). In the music selection means 21a, the high tempo music and the low tempo music are distinguished from each other and are stored. The music-play stopping means 22 stops the play of the music by the speaker 30 when sleepiness and an excited state of the occupant are determined to be equal to or higher than the set level by the activation degree determination means 10, that is, when the activation degree of the occupant is not in the appropriate state.

The music that arouses the pleasant emotion of the occupant is music that is related to individual episode of the occupant so as to be remained in memory and makes the occupant feel happy by recalling it. As the music to be selected, the music that an individual used to listen or the music that is considered to be preferred based on the age of the individual may be selected.

Here, emotion is a physical change that occurs based on information from sensory organs, and has pleasant emotion and unpleasant emotion. Between the emotions, the pleasant emotion is a state where the brain feels pleasant, and the brain gives instruction to the body and causes the body to act so as to approach and maintain the state. Therefore, when the occupant listens to pleasant music, the level of consciousness is increased and the sleepy occupant is awakened, and a state dominated by emotion is inhibited.

In addition, the speaker actuating means 20 includes a first timer 23 and a second timer 24. The first timer 23 counts elapse of a first setting time set in advance (for example, three minutes) after music is played by the music playing means 21. The music-play stopping means 22 functions when the elapse of the first setting time is counted by the first timer 23 and sleepiness and excited state of the occupant are determined to be equal to or higher than the set level by the activation degree determination means 10.

The second timer 24 counts elapse of a second setting time set in advance (for example, one minute) after the playing of the music is stopped by the music-play stopping means 22. The music playing means 21 functions again when the elapse of the setting time is counted by the second timer 24 and the activation degree determination means 10 determines that sleepiness and an excited state of the occupant are equal to or higher than the set level.

In the activation degree determination means 10, the sleepiness of the occupant can be determined by various known methods. In addition, an excited state of the occupant can be determined by, for example, the number of heart rates, an operation state of an accelerator pedal or a brake pedal, or an expression of the occupant. The determination of the activation degree such as the sleepiness and the excited state of the occupant is not specifically limited, and various determinations may be adopted.

Figure 2:
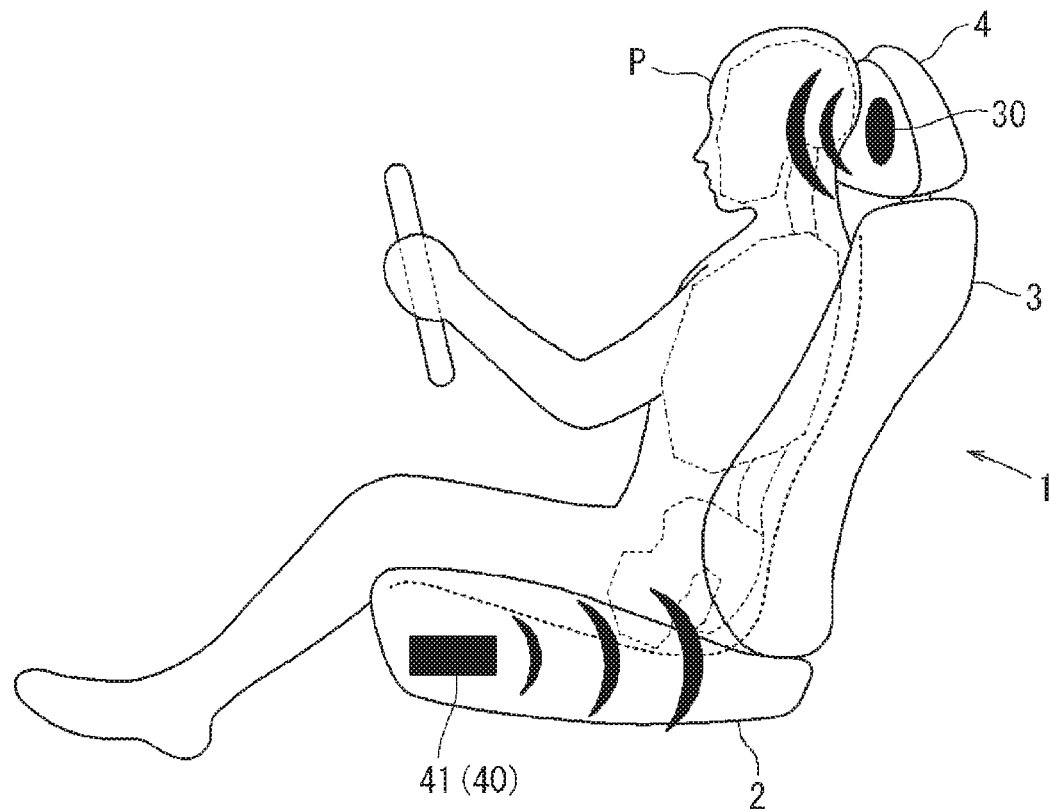
FIG. 2 is a schematic configuration view of a vehicle seat in the embodiment.
Figure 3:
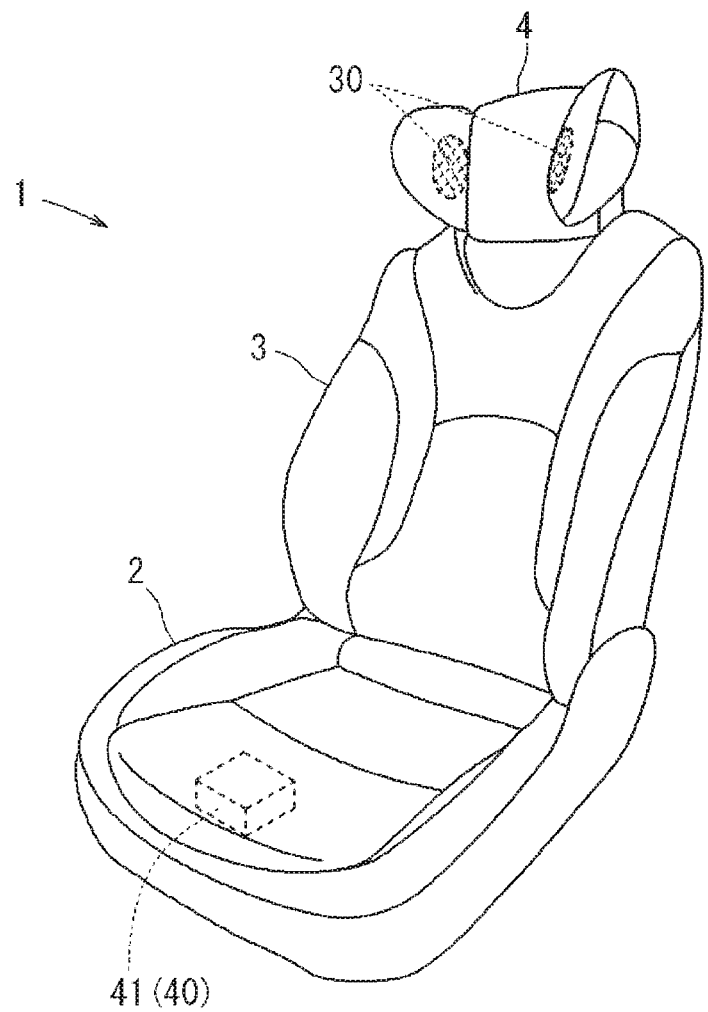
FIG. 3 is a perspective view of the vehicle seat.

FIGS. 2 and 3 show the speaker 30 and the vibration means 40 installed in a vehicle seat 1. As is well known, the vehicle seat 1 includes a seat cushion 2 serving as a seat portion, a seat back 3 serving as a backrest, and a headrest 4 provided at an upper end portion of the seat back 3.

The speakers 30 are provided on both left and right side portions of the headrest 4, respectively. Further, the speakers 30 are located at positions of the headrest 4 corresponding to ears of an occupant P seated on the vehicle seat 1.

The vibration means 40 includes a vibrator 41, and is fixed to a lower surface of a cushion panel (not shown) serving as a part of a frame member of the seat cushion 2. The cushion panel is vibrated when the vibrator 41 is actuated. As shown in a wave pattern of FIG. 2, vibration of the cushion panel is propagated to the entire vehicle seat 1 via the frame member (not shown), and is eventually transmitted to the occupant P.

The speaker 30 and the vibration means 40 are not limited to these structures and arrangements, and various structures and arrangements may be adopted.

<Operations and Effects of Embodiment>

Figure 9:
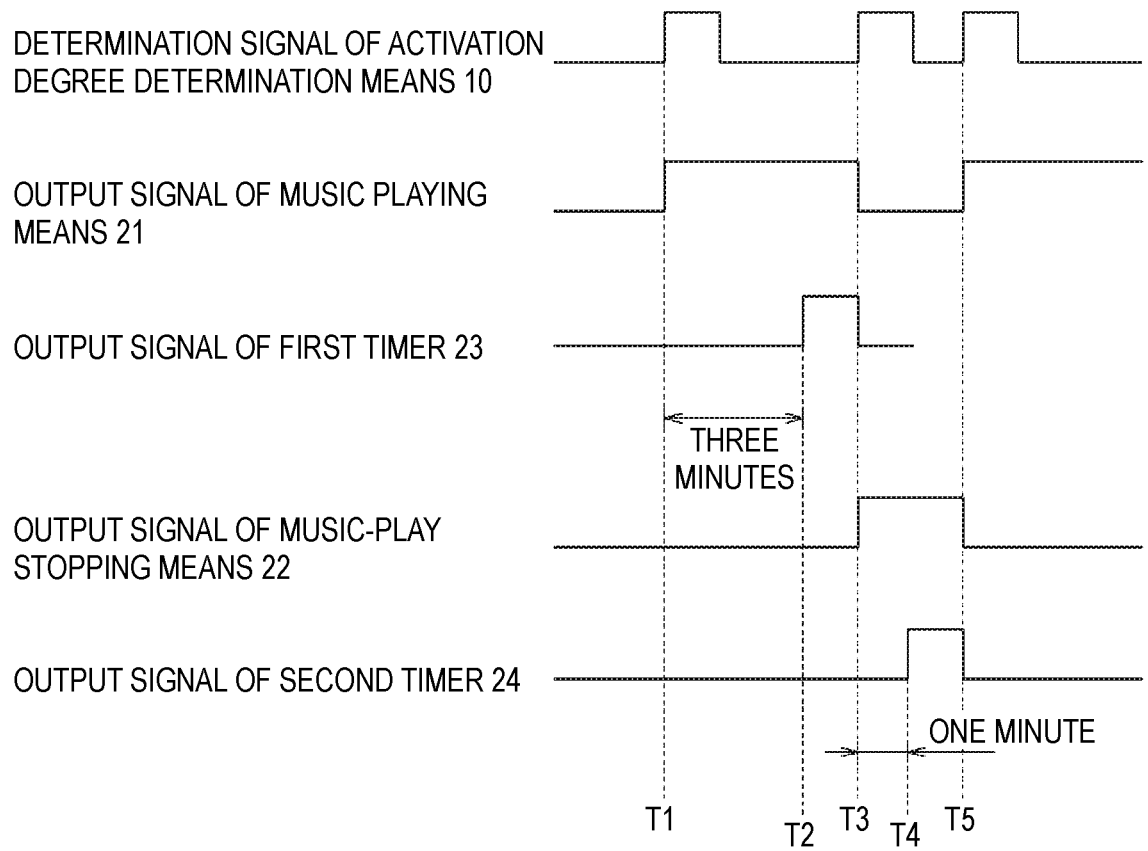
FIG. 9 is a time chart showing an operation state of the embodiment.

As indicated by T1 in FIG. 9, the music playing means 21 is actuated by a determination signal of the activation degree determination means 10 when the activation degree determination means 10 determines that the activation degree of the occupant P is not in the appropriate state. Accordingly, the music selected by the music selection means 21a is played by the speaker 30. The pleasant emotion of the occupant P is aroused by the played music. As a result, the activation degree of the occupant is set to the appropriate state.

As indicated by T2 in FIG. 9, the first timer 23 generates an output signal when the first setting time (for example, three minutes) is counted after the music has been played by the music playing means 21. Accordingly, as indicated by T3 in FIG. 9, the music-play stopping means 22 is then actuated to stop the playing of the music by the speaker 30 when the activation degree determination means 10 generates a determination signal. When the music-play stopping means 22 is actuated, the time counted by the first timer 23 is cleared and reset to zero. The play of the music is suddenly stopped in this way, so that the occupant P is stimulated and the activation degree thereof is made in the appropriate state.

As indicated by T4 in FIG. 9, the second timer 24 generates an output signal when the second setting time (for example, one minute) is counted after the playing of the music has been stopped by the music-play stopping means 22. According, as indicated by T5 in FIG. 9, the music playing means 21 is then actuated again and the playing of the music by the speaker 30 is resumed when the activation degree determination means 10 generates a determination signal. When the music playing means 21 is actuated, the counted time in the second timer 24 is cleared and reset to zero. The playing of the music is resumed in this way, so that the pleasant emotion of the occupant P is aroused and the activation degree thereof is made in the appropriate state.

<Specific Configuration (Part 1) of Embodiment>

Figure 4:
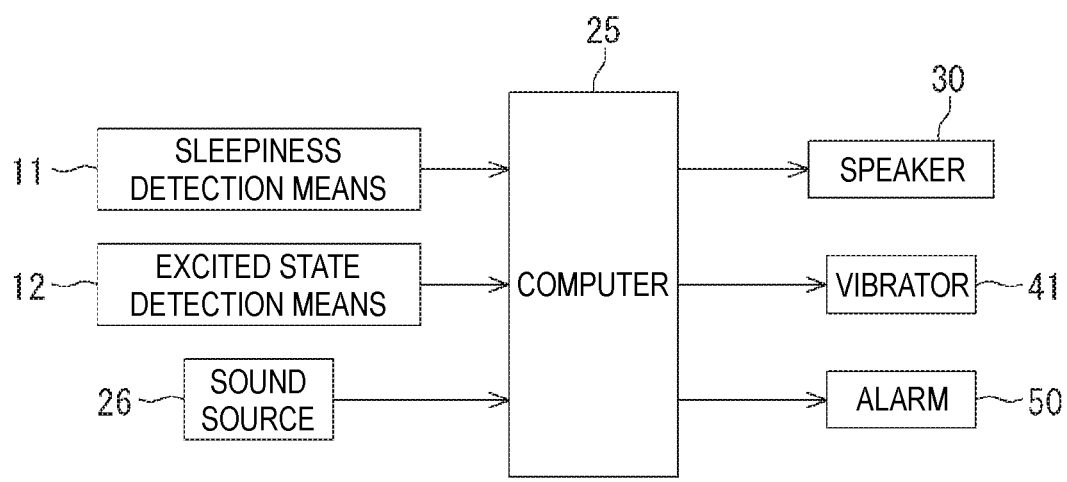
FIG. 4 is a system configuration diagram of the embodiment.

FIG. 4 shows a block circuit in a case where the embodiment is implemented by a computer 25 of a program control type. Detection signal from sleepiness detection means 11 and excited state detection means 12 are input to the computer 25. In addition, a sound source 26 containing the music selected by the occupant in advance is connected to the computer 25 in a manner capable of inputting the music thereto. Meanwhile, the computer 25 is connected to the speaker 30, the vibrator 41 serving as the vibration means 40, and an alarm device 50 so as to be capable of actuating the above devices. The alarm device 50 generates a strong warning sound toward the occupant P.

Figure 5:
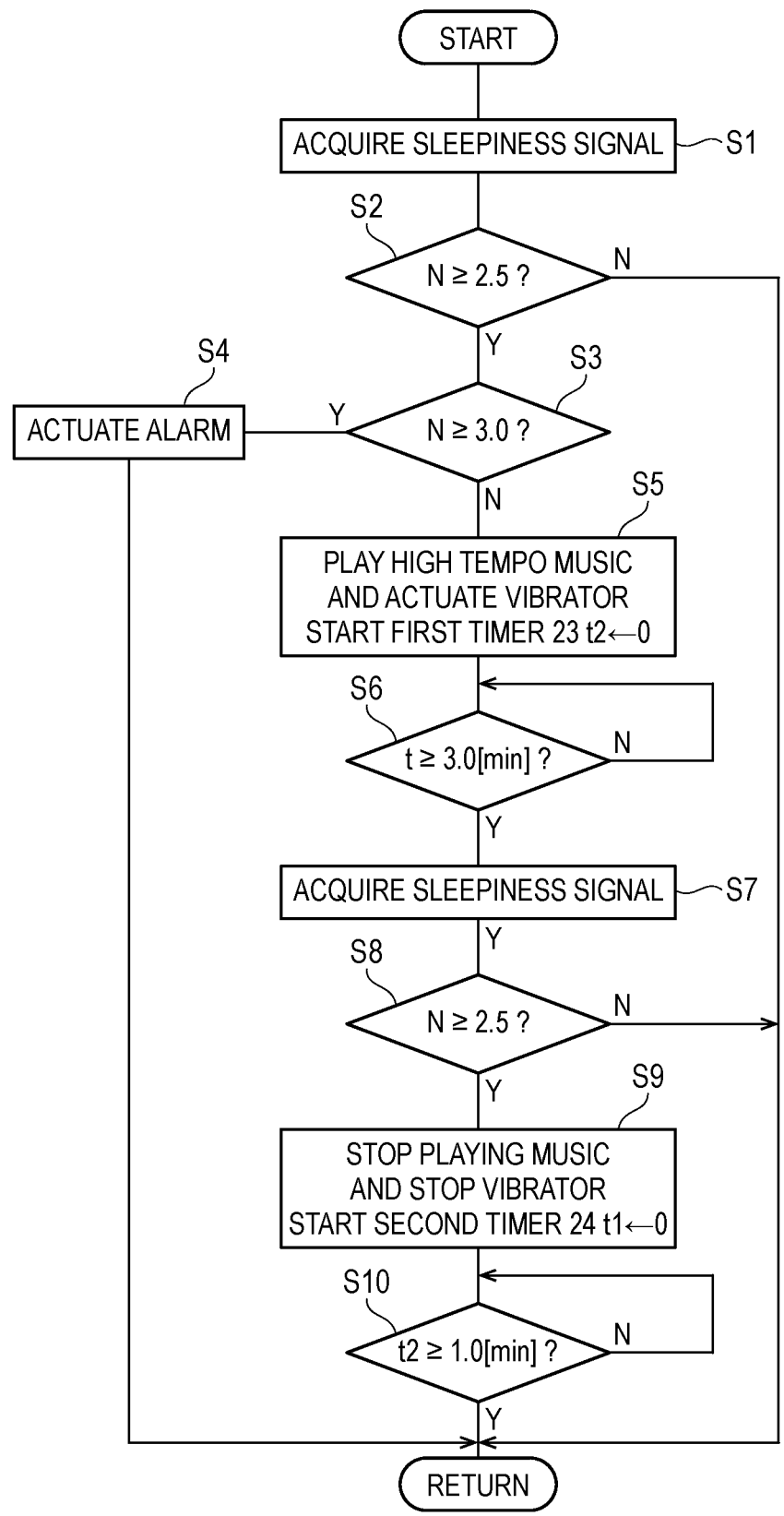
FIG. 5 is a flowchart showing a control content of awakening a sleepy occupant among control contents of a computer in the embodiment.
Figure 10:
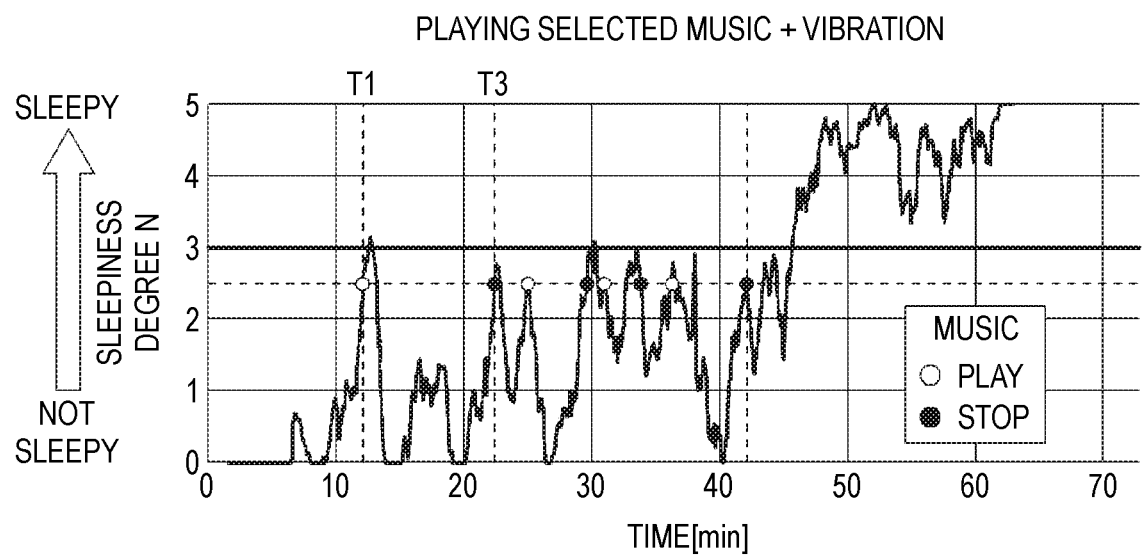
FIG. 10 is a first graph showing results of a test for sleepiness degree for an occupant.

FIG. 5 shows contents of a process routine of awakening a sleepy occupant among control contents of the computer 25. The processing routine is repeatedly performed at a constant time period of about 100 milliseconds. In addition, FIG. 10 shows results of a test for sleepiness degree of the occupant P. The test measures a sleepiness degree N of the occupant P during operation of a drive simulator.

In step S1, a sleepiness signal is acquired from the sleepiness detection means 11. As shown in FIGS. 6 and 10, the sleepiness degree N in the sleepiness signal varies in a range from "0" to "5", and is classified into six stages according to a state of sleepiness.

In step S2, whether the sleepiness degree N is equal to or greater than a preset value "2.5" is determined. In a case where the sleepiness degree N is smaller than "2.5", that is, the occupant P is in a state where the sleepiness thereof is not strong, a negative determination is made in step S2 and the processing in the processing routine is terminated.

When the sleepiness degree N is equal to or greater than "2.5" and an affirmative determination is made in step S2, whether the sleepiness degree N is equal to or greater than a preset value "3.0" is next determined in step S3. When the sleepiness degree N is equal to or greater than "3.0", the sleepiness is stronger than the state "quite sleepy" as shown in FIG. 6. Therefore, an affirmative determination is made in step S3, and the alarm device 50 is actuated in step S4. As a result, the occupant P is awakened forcefully.

When the sleepiness degree N is smaller than "3.0" and a negative determination is made in step S3, the high tempo music of 104 beat/min or higher in the music stored in the sound source 26 is played by the speaker 30 in step S5. At the same time, an electrical signal identical to that supplied to the speaker 30 is also supplied to the vibrator 41, thereby actuating the vibrator 41 to vibrate. Therefore, the music preferred by the occupant P is played by the speaker 30 and the body of the occupant P is vibrated by the vibrator 41 at this time, as shown in FIG. 2. The vibration applied to the occupant P is synchronized with the music since a signal identical to the signal supplied to the speaker 30 is supplied to the vibrator 41. Therefore, the pleasant emotion of the occupant P is aroused, and the occupant P is awakened. In FIGS. 9 and 10, the states after T1 correspond to this state.

In step S5, the first timer 23 is started, and the counted time t2 in the second timer 24 is cleared and reset to zero. In the next step S6, whether the counted time t1 in the first timer 23 reaches the first setting time (three minutes) or longer is determined. When the counted time t1 in the first timer 23 reaches the first setting time (three minutes) or longer, a negative determination is changed to an affirmative determination in step S6. In step S7, a sleepiness signal is acquired from the sleepiness detection means 11, similar to step S1.

In step S8, similar to step S2, whether the sleepiness degree N is equal to or greater than the preset value "2.5" is determined. In a case where the sleepiness degree N is smaller than "2.5", that is, the occupant P is in a state where the sleepiness thereof is not strong, a negative determination is made in step S8, and the processing in the processing routine is terminated. When the sleepiness degree N is equal to or greater than "2.5" and an affirmative determination is made in step S8, the play of the music of the speaker 30 is stopped and the operation of the vibrator 41 is also stopped in step S9. The occupant P is stimulated and awakened when the play of the music of the speaker 30 and the operation of the vibrator 41 are suddenly stopped. In FIGS. 9 and 10, the state after T3 corresponds to this state.

In step S9, the second timer 24 is started, and the counted time t1 in the first timer 23 is cleared and reset to zero. In the next step S10, whether the counted time t2 in the second timer 24 reaches the second setting time (one minute) or longer is determined. When the counted time t2 in the second timer 24 reaches the second setting time (one minute) or longer, a negative determination is changed to an affirmative determination in step S10, and the processing in the processing routine is terminated.

After that, the processing in the processing routine of FIG. 5 is repeated. The music is played if the sleepiness degree N is equal to or greater than the setting value "2.5", so that the pleasant emotion of the occupant P is aroused, and the occupant P is awakened. Thereafter, the play of the music is continued for three minutes. Then, the play of the music is stopped if the sleepiness degree N is equal to or greater than the setting value "2.5" again, so that the occupant P is awakened. Thereafter, the state where the play of the music is stopped is continued for one minute. The music is played if the sleepiness degree N is equal to or greater than the setting value "2.5" again, so that the pleasant emotion of the occupant P is aroused, and the occupant P is awakened. In this way, it is possible to reduce sleepiness by using the pleasant emotion without giving pain to the occupant P over a long period of time. The situation is shown between 10th minute and 45th minute in FIG. 10.

<Description of Comparative Example>

FIGS. 11 to 14 show changes in the sleepiness degree N in a case where conditions of the music from the speaker 30 and the operation of the vibrator 41 is changed under test conditions identical to the case in FIG. 10. In FIGS. 10 to 13, a white circle indicates timing when the music is played and/or the vibrator 41 is actuated, and a black circle indicates timing when the play of the music and/or the operation of the vibrator 41 are/is stopped.

Figure 11:
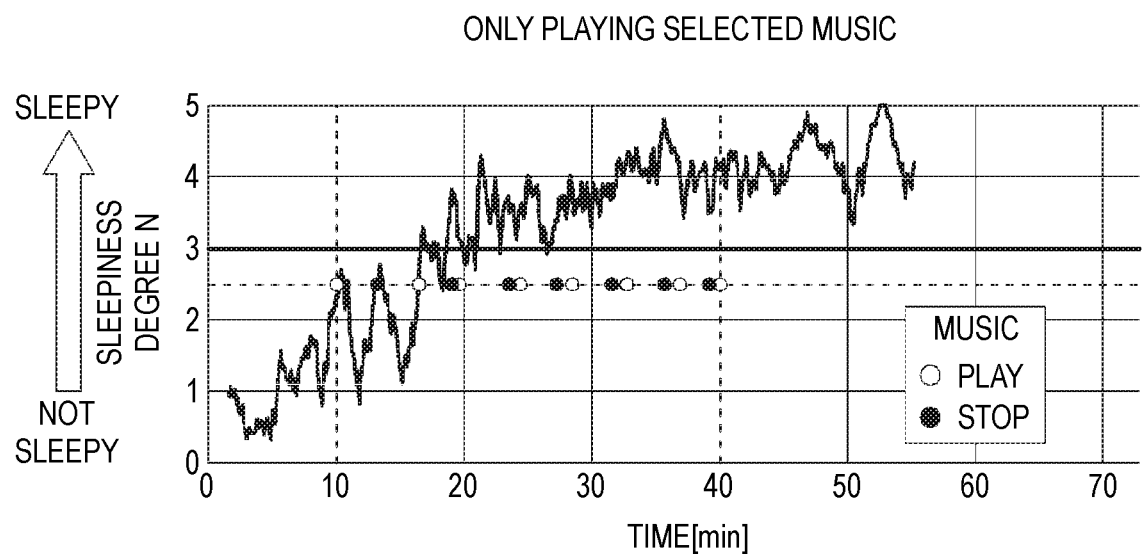
FIG. 11 is a second graph showing results of a test for sleepiness degree for an occupant.

FIG. 11 shows data in a case where music from the speaker 30 is set to the music preferred by the occupant P, and the vibration via the vibrator 41 is not performed, similar to the case in FIG. 10. As apparent from the above, the effect of reducing the sleepiness degree N is recognized from the start of playing the music, through stop of the playing, until the playing is performed again. However, the effect of reducing the sleepiness degree N is not recognized thereafter even though the similar control is performed. As described above, in a case where only the music preferred by the occupant P is played and the vibration via the vibrator 41 is not performed, the effect in short time can be obtained. However, the effect in long time cannot be confirmed.

Figure 12:
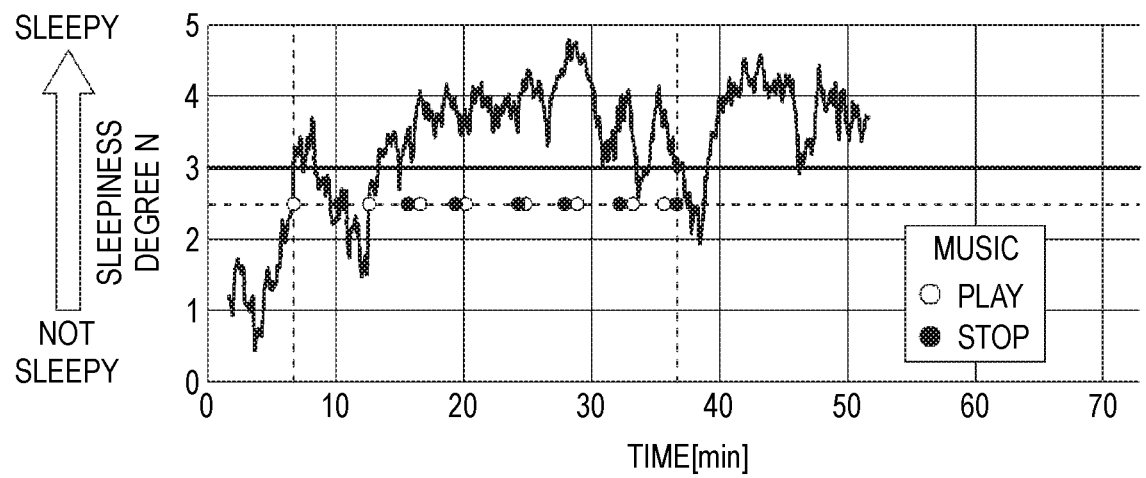
FIG. 12 is a third graph showing results of a test for sleepiness degree for an occupant.

FIG. 12 shows data in a case where the music from the speaker 30 is not the music preferred by the occupant P, but is music selected regardless of preference. In this case, the vibration via the vibrator 41 is performed in synchronization with the playing of the music. In the case of FIG. 12, the decrease in the sleepiness degree N is recognized by the first play of music, but as a whole, correlation is hardly recognized between the playing of the music and the operation of the vibrator 41 and the change in the sleepiness degree N of the occupant P.

Figure 13:
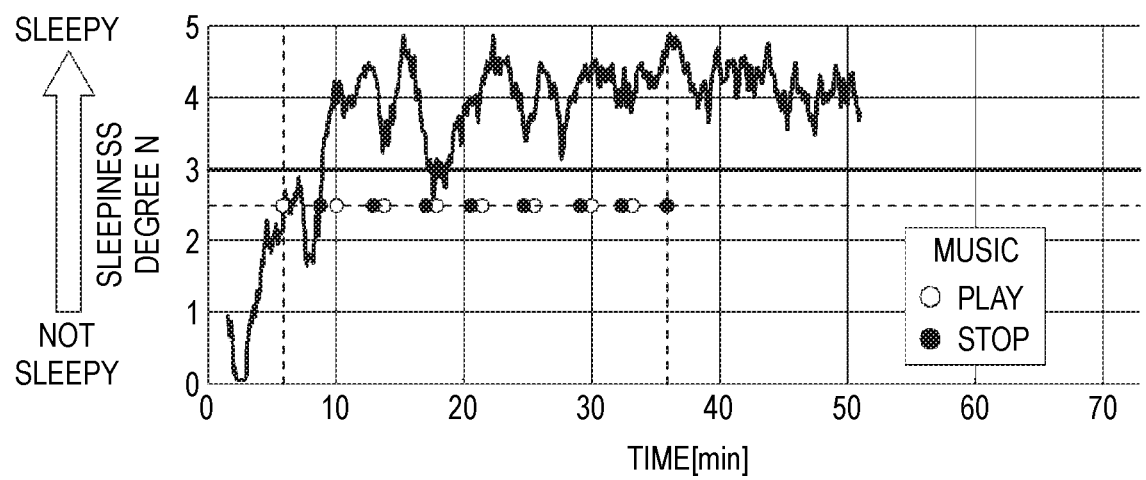
FIG. 13 is a fourth graph showing results of a test for sleepiness degree for an occupant.

FIG. 13 shows data in a case where music from the speaker 30 is the music selected regardless of the preference of the occupant P. and the vibration via the vibrator 41 is not performed. In the case of FIG. 13, similar to the case of FIG. 12, the slight decrease in the sleepiness degree N is also recognized by the first play of music. However, as a whole, correlation is hardly recognized between the play of the music and the change in the sleepiness degree N of the occupant P.

Figure 14:
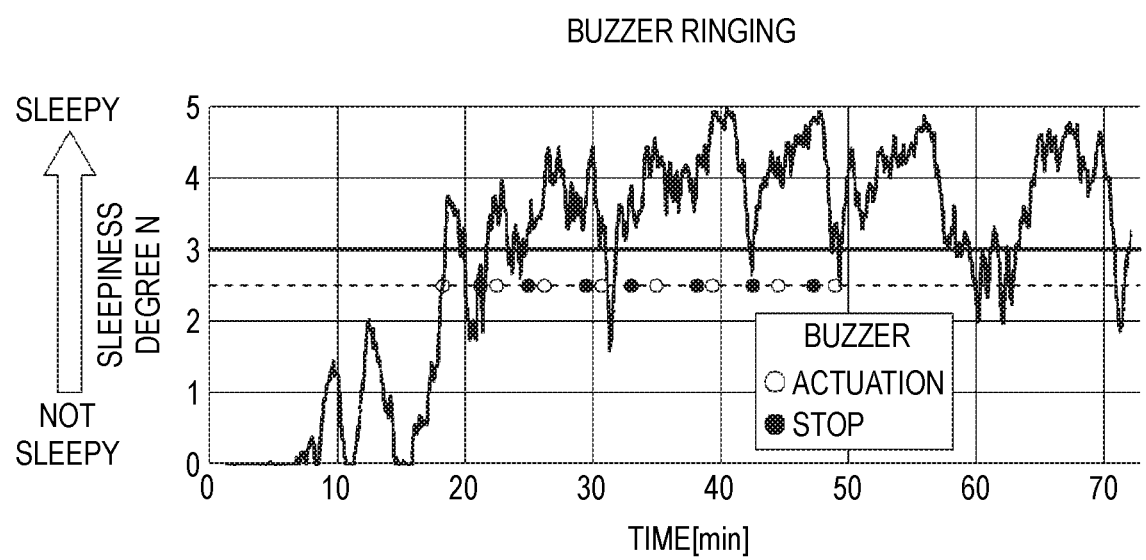
FIG. 14 is a fifth graph showing results of a test for sleepiness degree for an occupant.

FIG. 14 shows data in a case where a buzzer sound instead of the music from the speaker 30 is played. The vibration via the vibrator 41 is not performed. In FIG. 14, a white circle indicates timing when the buzzer sound is played, and a black circle indicates timing when the play of the buzzer sound is stopped. In this case, as a whole, correlation is hardly recognized between the play of the buzzer sound and the change in the sleepiness degree N of the occupant P.

<Specific Configuration (Part 2) of Embodiment>

Figure 7:
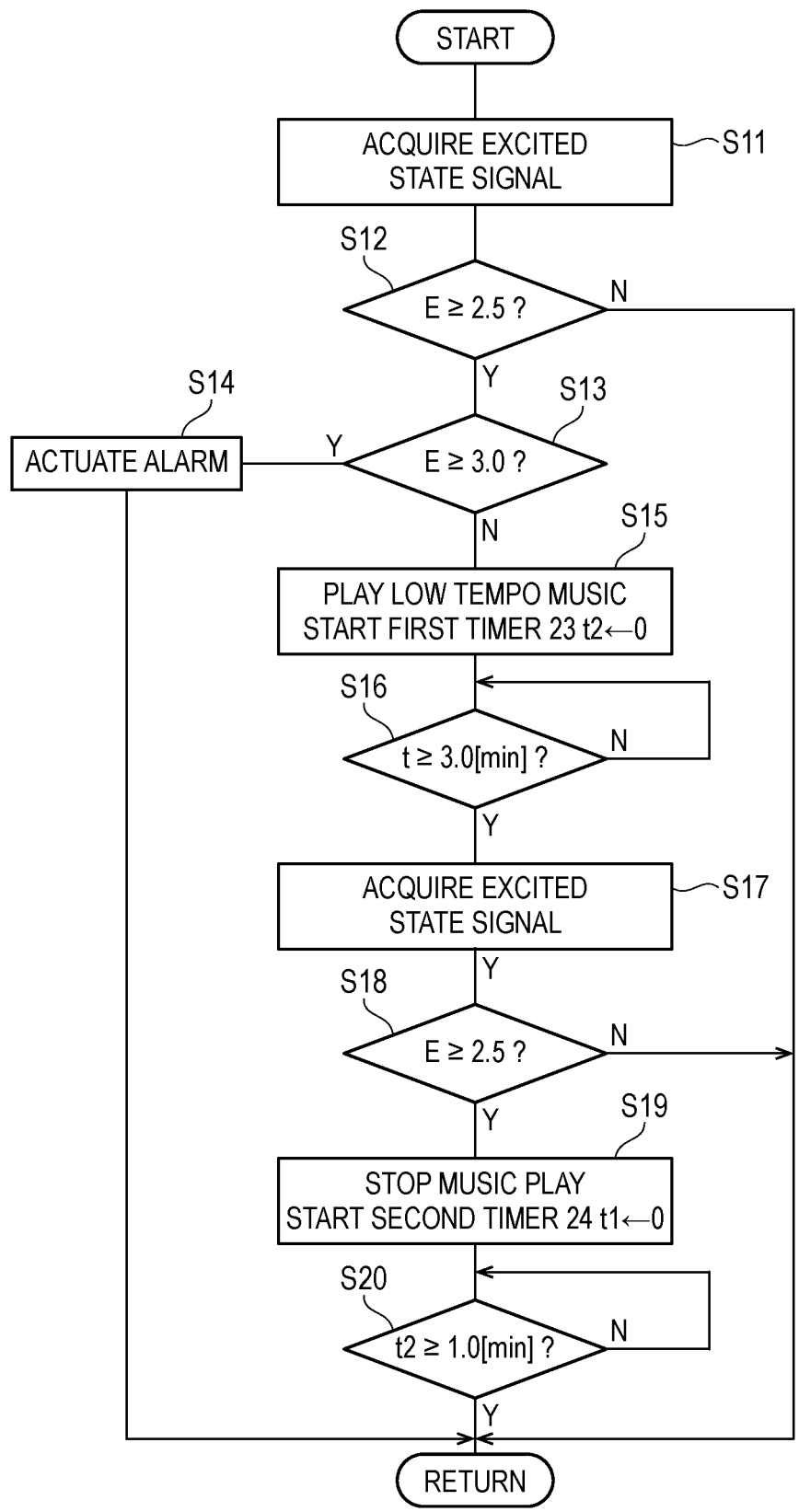
FIG. 7 is a flowchart showing a control content of calming excited state among the control contents of the computer in the embodiment.

FIG. 7 shows contents of a processing routine of calming the excited state among the control contents of the computer 25. The processing routine is repeatedly performed at a constant time period of about 100 milliseconds, similar to the processing routine in FIG. 5.

The processing routine in FIG. 7 is different from the processing routine in FIG. 5 in the following aspects; the step of acquiring the sleepiness signal from the sleepiness detection means 11 is replaced with a step of acquiring an excited state signal from the excited state detection means 12; the activation degree is changed from sleepiness to the excited state; the music to be played is changed from high tempo music of 104 beat/min or higher to low tempo music of 60 beat/min or lower; and further the vibration via the vibrator 41 is not performed. The processing routine in FIG.

7 and the processing routine in FIG. 5 are identical in other aspects, and repeated descriptions of the identical contents will be omitted.

Figure 8:
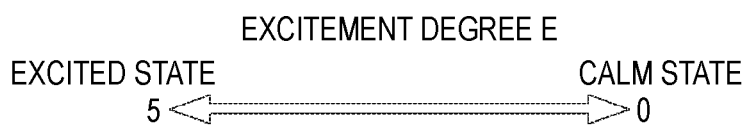
FIG. 8 is a diagram showing a level of an excitement degree E in the control of the computer.

In FIG. 8, the level of an excitement degree E handled by the processing routine in FIG. 7 is classified into six stages of "0=calm state" to "5=excited state". Therefore, in steps S12, S13, and S18, whether the excitement degree E is equal to or greater than a preset value "2.5" or "3.0" is determined. As a result, by repeating the processing of the processing routine in FIG. 7, the low tempo music is played to arouse the pleasant emotion of the occupant P and calm the excited state thereof if the excitement degree E is equal to or greater than the setting value "2.5". Thereafter, the playing of the music is continued for three minutes, and then the playing of the music is stopped to calm an excited state of the occupant P if the excitement degree E is equal to or greater than the setting value "2.5" again. Thereafter, the state where the playing of the music is stopped is continued for one minute, and the music is played to arouse the pleasant emotion of the occupant P and calm the excited state thereof if the excitement degree E is equal to or greater than the setting value "2.5" again. In this way, it is possible to calm the excited state of the occupant P by using the pleasant emotion without giving pain to the occupant P over a long period of time.

<Corresponding Relationship Between Configuration of Embodiments and Configuration of Disclosure>

In the processing routines of FIGS. 5 and 7, the processes of steps S1, S2, S7, and S8, and of steps S11, S12, S17, and S18 correspond to the activation degree determination means of the disclosure. In addition, in the processing routines of FIGS. 5 and 7, the processes of steps S5, S6, S9, and S10, and of steps S15, S16, S19, and S20 correspond to the speaker actuating means of the disclosure. In the processing routine of FIGS. 5 and 7, the processes of steps S5 and S15 correspond to the music playing means of the disclosure. In the processing routines of FIGS. 5 and 7, the processes of steps S9 and S19 correspond to the music-play stopping means of the disclosure. In the processing routines of FIGS. 5 and 7, the processes of steps S5, S6, S15, and S16 correspond to the first timer of the disclosure. Further, in the processing routines of FIGS. 5 and 7, the processes of steps S9, S10, S19, and S20 correspond to the second timer of the disclosure.

<Other Embodiments>

Although specific embodiments have been described above, the disclosure is not limited to those appearances and configurations, and modifications, additions and deletions can be made thereto. For example, in the above embodiments, music that arouses the pleasant emotion is played for both the sleepiness and the excited state of the occupant. Alternatively, music that arouses the pleasant emotion may be played for only one of the sleepiness and the excited state. In addition, the above embodiments show examples in which the sleepiness and excited state as the activation degree of the occupant is targeted. Alternatively, the disclosure may provide a system in which the activation degree is, for example, attention and concentration due to influence of fatigue or the like.

The disclosure provides illustrative, non-limiting examples as follows:

According to a first aspect of the disclosure, there is provided a system of optimizing an activation degree of an occupant of a vehicle, the system including: activation degree determination means for detecting an activation degree of an occupant and determining whether the detected activation degree is in an appropriate state set in advance; a speaker configured to play music for the occupant; and speaker actuating means for selecting music which is unique to the occupant, which arouses pleasant emotion of the occupant, and which is high tempo music having a tempo equal to or higher than a predetermined tempo or low tempo music having a tempo equal to or lower than a predetermined tempo, and actuating the speaker to play the selected music when the activation degree determination means determines that the activation degree of the occupant is not in the appropriate state.

According to the first aspect, the speaker actuating means actuates the speaker to play the selected music which is unique to the occupant and arouses the pleasant emotion of the occupant when the activation degree determination means determines that the activation degree of the occupant is not in the appropriate state. It is possible to prevent the occupant from feeling unpleasant and make the activation degree of the occupant in the appropriate state by arousing the pleasant emotion of the occupant.

Emotion is a physical change that occurs based on information from sensory organs, and has pleasant emotion and unpleasant emotion. Between the emotions, the pleasant emotion is a state where the brain feels pleasant, and the brain gives instruction to the body and causes the body to act so as to approach and maintain the state. Therefore, when the occupant listens to pleasant music, the level of consciousness is increased and the sleepy occupant is awakened, and a state dominated by emotion is inhibited.

According to a second aspect of the disclosure, there is provided the system of optimizing an activation degree of an occupant of a vehicle according to the first aspect, wherein the speaker actuating means includes: music playing means for playing the music when the activation degree determination means determines that the activation degree of the occupant is not in the appropriate state in a state where playing of the music is stopped; and music-play stopping means for stopping playing of the music when the activation degree determination means determines that the activation degree of the occupant is not in the appropriate state in a state where the music is played.

According to the second aspect, the music-play stopping means stops the playing of the music when the activation degree determination unit determines that the activation degree of the occupant is not in the appropriate state in a state where the music is played. Meanwhile, the music playing means plays the music when the activation degree determination means determines that the activation degree of the occupant is not in the appropriate state in a state where the playing of the music is stopped. As a result, it is possible to prevent the occupant from feeling unpleasant and maintain the activation degree of the occupant in the appropriate state over a long period of time by repeating the playing and the stopping of the music.

According to a third aspect of the disclosure, there is provided the system of optimizing an activation degree of an occupant of a vehicle according to the second aspect, wherein the speaker actuating means includes: a first timer configured to count an elapse of a first setting time set in advance after the music has been played by the music playing means; and a second timer configured to count an elapse of a second setting time set in advance after the playing of the music has been stopped by the music-play stopping means, wherein the music-play stopping means is capable of being actuated when the elapse of the first setting time is counted by the first timer, and wherein the music playing means is capable of being actuated when the elapse of the second setting time is counted by the second timer.

According to the third aspect, when the first setting time is counted by the first timer after the selected music is played, the music-play stopping means stops the playing of the music when the activation degree determination means determines that the activation degree of the occupant is not in the appropriate state. Meanwhile, when the second setting time is counted by the second timer after the play of the music is stopped, the music playing means plays the music when the activation degree determination means determines that the activation degree of the occupant is not in the appropriate state. As a result, it is possible to prevent the occupant from feeling unpleasant and maintain the activation degree of the occupant in the appropriate state over a long period of time by repeating the play and stop of the music.

According to a fourth aspect of the disclosure, there is provided the system of optimizing an activation degree of an occupant of a vehicle according to the third aspect, wherein the first setting time is longer than the second setting time.

According to the fourth aspect, the music-play time is given priority over the stop time since the first setting time is longer than the second setting time. Accordingly, the time to enjoy music can be ensured, and comfort of the occupant can be increased.

According to a fifth aspect of the disclosure, there is provided the system of optimizing an activation degree of an occupant of a vehicle according to the first or second aspect, the system further including: vibration means for vibrating at least a part of a body of the occupant seated on a vehicle seat, wherein the vibration means is actuated in synchronization with the speaker actuated by the speaker actuating means.

According to the fifth aspect, the body of the occupant is vibrated by the vibration means in synchronization with the playing of the music by the speaker. As a result, the activation degree of the occupant can be more effectively made in the appropriate state.

According to a sixth aspect of the disclosure, there is provided the system of optimizing an activation degree of an occupant of a vehicle according to any one of the first to fifth aspects, wherein the activation degree determination means determines that the activation degree is excessively low based on sleepiness, fatigue, malaise, or a state dominated by emotion of the occupant, and wherein the speaker actuating means plays the high tempo music.

According to the sixth aspect, the high tempo music is played when the activation degree of the occupant is excessively low, so that the activation degree of the occupant can be increased to the appropriate state.

According to a seventh aspect of the disclosure, there is provided the system of optimizing an activation degree of an occupant of a vehicle according to any one of the first to fifth aspects, wherein the activation degree determination means determines that the activation degree is excessively high based on a state dominated by emotion of the occupant, and wherein the speaker actuating means plays the low tempo music.

According to the seventh aspect, the low tempo music is played when the activation degree of the occupant is excessively high, so that the activation degree of the occupant can be reduced to the appropriate state.

According to an eighth aspect of the disclosure, there is provided a system of optimizing an activation degree of an occupant of a vehicle, the system including: a speaker configured to play music for the occupant; and a controller configured to: determine whether an activation degree detected by an detector is in an appropriate state set in advance; and actuate the speaker to play music when determined that the activation degree of the occupant is not in the appropriate state, the music being selected in advance, being unique to the occupant, arousing pleasant emotion of the occupant, and being high tempo music having a tempo equal to or higher than a predetermined tempo or low tempo music having a tempo equal to or lower than a predetermined tempo.

According to the eighth aspect, the controller actuates the speaker to play the selected music which is unique to the occupant and arouses the pleasant emotion of the occupant when determined that the activation degree of the occupant is not in the appropriate state. It is possible to prevent the occupant from feeling unpleasant and make the activation degree of the occupant in the appropriate state by arousing the pleasant emotion of the occupant.

Emotion is a physical change that occurs based on information from sensory organs, and has pleasant emotion and unpleasant emotion. Between the emotions, the pleasant emotion is a state where the brain feels pleasant, and the brain gives instruction to the body and causes the body to act so as to approach and maintain the state. Therefore, when the occupant listens to pleasant music, the level of consciousness is increased and the sleepy occupant is awakened, and a state dominated by emotion is inhibited.

According to a ninth aspect of the disclosure, there is provided the system of optimizing an activation degree of an occupant of a vehicle according to the eighth aspect, wherein the controller is configured to: cause the speaker to play the music when determined that the activation degree of the occupant is not in the appropriate state in a state where playing of the music is stopped; and cause the speaker to stop playing of the music when determined that the activation degree of the occupant is not in the appropriate state in a state where the music is played.

According to the ninth aspect, the controller causes the speaker to stop the playing of the music when determined that the activation degree of the occupant is not in the appropriate state in a state where the music is played. Meanwhile, the controller causes the speaker to play the music when determined that the activation degree of the occupant is not in the appropriate state in a state where the playing of the music is stopped. As a result, it is possible to prevent the occupant from feeling unpleasant and maintain the activation degree of the occupant in the appropriate state over a long period of time by repeating the playing and the stopping of the music.

According to a tenth aspect of the disclosure, there is provided the system of optimizing an activation degree of an occupant of a vehicle according to the ninth aspect, wherein the controller is configured to: count elapse of a first setting time set in advance after the music has been played, the music having been played when determined that the activation degree of the occupant is not in the appropriate state in the state where the playing of the music is stopped; and count elapse of a second setting time set in advance after the playing of the music has been stopped, the music having been stopped when determined that the activation degree of the occupant is not in the appropriate state in the state where the music is played wherein the controller is configured to cause the speaker to stop the playing of the music when the elapse of the first setting time is counted, and wherein the controller is configured to cause the speaker to play the music when the elapse of the second setting time is counted.

According to the tenth aspect, when the first setting time is counted by the controller after the selected music is played, the controller causes the speaker to stop the playing of the music when determined that the activation degree of the occupant is not in the appropriate state. Meanwhile, when the second setting time is counted by the controller after the play of the music is stopped, the controller causes the speaker to play the music when determined that the activation degree of the occupant is not in the appropriate state. As a result, it is possible to prevent the occupant from feeling unpleasant and maintain the activation degree of the occupant in the appropriate state over a long period of time by repeating the play and stop of the music.

According to an eleventh aspect of the disclosure, there is provided the system of optimizing an activation degree of an occupant of a vehicle according to the tenth aspect, wherein the first setting time is longer than the second setting time.

According to the eleventh aspect, the music-play time is given priority over the stop time since the first setting time is longer than the second setting time. Accordingly, the time to enjoy music can be ensured, and comfort of the occupant can be increased.

According to a twelfth aspect of the disclosure, there is provided the system of optimizing an activation degree of an occupant of a vehicle according to claim 8 or 9, the system further including: a vibrator configured to vibrate at least a part of a body of the occupant seated on a vehicle seat, wherein the controller is configured to actuate the vibrator in synchronization with the actuating of the speaker.

According to the twelfth aspect, the body of the occupant is vibrated by the vibration means in synchronization with the playing of the music by the speaker. As a result, the activation degree of the occupant can be more effectively made in the appropriate state.

According to a thirteenth aspect of the disclosure, there is provided the system of optimizing an activation degree of an occupant of a vehicle according to any one of the eighth to twelfth aspects, wherein the controller is configured to determine that the activation degree is excessively low based on sleepiness, fatigue, malaise, or a state dominated by emotion of the occupant, and wherein the controller is configured to cause the speaker to play the high tempo music.

According to the thirteenth aspect, the high tempo music is played when the activation degree of the occupant is excessively low, so that the activation degree of the occupant can be increased to the appropriate state.

According to a fourteenth aspect of the disclosure, there is provided the system of optimizing an activation degree of an occupant of a vehicle according to any one of the eighth to twelfth aspects, wherein the controller is configured to determine that the activation degree is excessively high based on a state dominated by emotion of the occupant, and wherein the controller is configured to cause the speaker to play the low tempo music.

According to the fourteenth aspect, the low tempo music is played when the activation degree of the occupant is excessively high, so that the activation degree of the occupant can be reduced to the appropriate state.

According to a fifteenth aspect of the disclosure, there is provided the system of optimizing an activation degree of an occupant of a vehicle according to any one of the eighth to fourteenth aspects, wherein the music, which is played by the speaker when determined that the activation degree of the occupant is not in the appropriate state, is selected in advance by the controller.

What is claimed is:

1. A system of optimizing an activation degree of an occupant of a vehicle, the system comprising:
an activation degree determination detector for detecting an activation degree of an occupant and determining whether the detected activation degree is in an appropriate state set in advance;
a speaker configured to play music for the occupant; and
a speaker actuating controller for selecting music which is unique to the occupant, which arouses pleasant emotion of the occupant, and which is high tempo music having a tempo equal to or higher than a predetermined tempo or low tempo music having a tempo equal to or lower than a predetermined tempo, and actuating the speaker to play the selected music when the activation degree determination detector determines that the activation degree of the occupant is not in the appropriate state,
wherein the speaker actuating controller includes:
a music playing controller for playing the music when the activation degree determination detector determines that the activation degree of the occupant is not in the appropriate state in a state where playing of the music is stopped; and
a music-play stopping controller for stopping playing of the music when the activation degree determination detector determines that the activation degree of the occupant is not in the appropriate state in a state where the music is played, and
when the music-play stopping controller stops playing of the music, no music is played from the speaker.

2. The system of optimizing the activation degree of the occupant of the vehicle according to claim 1,
wherein the speaker actuating controller further includes:
a first timer configured to count an elapse of a first setting time set in advance after the music has been played by the music playing controller; and
a second timer configured to count an elapse of a second setting time set in advance after the playing of the music has been stopped by the music-play stopping controller,
wherein the music-play stopping controller is configured to be actuated when the elapse of the first setting time is counted by the first timer, and
wherein the music playing controller is configured to be actuated when the elapse of the second setting time is counted by the second timer.

3. The system of optimizing the activation degree of the occupant of the vehicle according to claim 2,
wherein the first setting time is longer than the second setting time.

4. The system of optimizing the activation degree of the occupant of the vehicle according to claim 1, the system further comprising:
a vibrator for vibrating at least a part of a body of the occupant seated on a vehicle seat,
wherein the vibrator is actuated in synchronization with the speaker actuated by the speaker actuator.

5. The system of optimizing the activation degree of the occupant of the vehicle according to claim 1,
wherein the activation degree determination detector determines that the activation degree is excessively low based on sleepiness, fatigue, malaise, or a state dominated by emotion of the occupant, and
wherein the speaker actuating controller plays the high tempo music.

6. The system of optimizing the activation degree of the occupant of the vehicle according to claim 1, wherein the activation degree determination detector determines that the activation degree is excessively high based on a state dominated by emotion of the occupant, and wherein the speaker actuating controller plays the low tempo music.

7. A system of optimizing an activation degree of an occupant of a vehicle, the system comprising:

a speaker configured to play music for the occupant; and a controller configured to:

determine whether an activation degree detected by a detector is in an appropriate state set in advance;

actuate the speaker to play music when it is determined that the activation degree of the occupant is not in the appropriate state, the music being selected in advance, being unique to the occupant, arousing pleasant emotion of the occupant, and being high tempo music having a tempo equal to or higher than a predetermined tempo or low tempo music having a tempo equal to or lower than a predetermined tempo;

cause the speaker to play the music when it is determined that the activation degree of the occupant is not in the appropriate state in a state where playing of the music is stopped; and cause the speaker to stop playing of the music such that no music is played from the speaker when it is determined that the activation degree of the occupant is not in the appropriate state in a state where the music is played.

8. The system of optimizing the activation degree of the occupant of the vehicle according to claim 7, wherein the controller is further configured to:

count elapse of a first setting time set in advance after the music has been played, the music having been played when determined that the activation degree of the occupant is not in the appropriate state in the state where the playing of the music is stopped; and count elapse of a second setting time set in advance after the playing of the music has been stopped, the music having been stopped when determined that the activation degree of the occupant is not in the appropriate state in the state where the music is played, wherein the controller is configured to cause the speaker to stop the playing of the music when the elapse of the first setting time is counted, and wherein the controller is configured to cause the speaker to play the music when the elapse of the second setting time is counted.

9. The system of optimizing the activation degree of the occupant of the vehicle according to claim 8, wherein the first setting time is longer than the second setting time.

10. The system of optimizing the activation degree of the occupant of the vehicle according to claim 7, the system further comprising:

a vibrator configured to vibrate at least a part of a body of the occupant seated on a vehicle seat, wherein the controller is configured to actuate the vibrator in synchronization with the actuating of the speaker.

11. The system of optimizing the activation degree of the occupant of the vehicle according to claim 7, wherein the controller is configured to determine that the activation degree is excessively low based on sleepiness, fatigue, malaise, or a state dominated by emotion of the occupant, and wherein the controller is configured to cause the speaker to play the high tempo music.

12. The system of optimizing the activation degree of the occupant of the vehicle according to claim 7, wherein the controller is configured to determine that the activation degree is excessively high based on a state dominated by emotion of the occupant, and wherein the controller is configured to cause the speaker to play the low tempo music.

13. The system of optimizing the activation degree of the occupant of the vehicle according to claim 7, wherein the music, which is played by the speaker when determined that the activation degree of the occupant is not in the appropriate state, is selected in advance by the controller.

* * * * *